(12) United States Patent
Peterson (10) Patent No.: US 6,501,772 B1
(45) Date of Patent: Dec. 31, 2002

(54) MICROLASER ASSEMBLY HAVING A MICRORESONATOR AND ALIGNED ELECTRO-OPTIC COMPONENTS

(75) Inventor: Brian Lee Peterson, Charlotte, NC (US)

(73) Assignee: Litton Systems, Inc., Los Angeles, CA (US)

( * ) Notice: Subject to any disclaimer, the term of this patent is extended or adjusted under 35 U.S.C. 154(b) by 188 days.

(21) Appl. No.: 09/637,469

(22) Filed: Aug. 11, 2000

(51) Int. Cl.[7] .................................................. H01S 3/11
(52) U.S. Cl. ........................................... 372/10; 372/66
(58) Field of Search .............................. 372/10, 12, 16, 372/92, 98, 100, 107

(56) References Cited

U.S. PATENT DOCUMENTS

| | | | |
|---|---|---|---|
| 3,609,389 A | * 9/1971 | Ernst | 307/88.3 |
| 3,810,041 A | 5/1974 | Martin | |
| 4,191,931 A | 3/1980 | Kuppenheimer | |
| 4,698,816 A | * 10/1987 | Chun | 372/19 |
| 4,894,839 A | 1/1990 | Baer | |
| 4,953,166 A | 8/1990 | Mooradian | |
| 5,305,345 A | 4/1994 | Albrecht et al. | |
| 5,317,447 A | * 5/1994 | Baird et al. | 359/328 |
| 5,394,413 A | 2/1995 | Zayhowski | |
| 5,408,480 A | 4/1995 | Hemmati | |
| 5,455,838 A | 10/1995 | Heritier et al. | |
| 5,463,649 A | 10/1995 | Ashby et al. | |
| 5,479,430 A | 12/1995 | Shine, Jr. et al. | |
| 5,488,619 A | 1/1996 | Injeyan et al. | |
| 5,546,416 A | 8/1996 | Basu | |
| 5,555,254 A | 9/1996 | Injeyan et al. | |
| 5,610,933 A | * 3/1997 | Jani et al. | 372/41 |
| 5,673,281 A | * 9/1997 | Byer | 372/3 |
| 5,732,100 A | 3/1998 | Thony et al. | |
| 5,832,010 A | 11/1998 | Fulbert et al. | |
| 5,844,932 A | 12/1998 | Thony et al. | |
| 6,072,815 A | 6/2000 | Peterson | |

FOREIGN PATENT DOCUMENTS

JP          5-7046 A      1/1993

* cited by examiner

Primary Examiner—Paul Ip
Assistant Examiner—Tuan Nguyen
(74) Attorney, Agent, or Firm—Alston & Bird LLP (57) ABSTRACT

A microlaser assembly is provided that includes a microresonator, such as a side pumped microresonator having an active gain medium and a passive Q-switch, a pump source for inducing resonation of the microresonator and the generation of laser signals, one or more electro-optic components, such as one or more non-linear crystals, amplifiers, oscillators or active gain mediums, for modifying the laser signals emitted by the microlaser and a beam steering element for aligning the laser signals emitted by the microresonator with the electro-optic components. The beam steering element is preferably controllably adjustable so as to precisely align the laser signals emitted by the microresonator with an electro-optic component. In order to provide more general alignment, the microlaser assembly can also include a mechanical alignment member. For example, the microlaser assembly can include a first mechanical alignment member for aligning the microresonator and the beam steering element and a second mechanical alignment member for aligning the beam steering element and the electro-optic component. In this regard, the first and second mechanical alignment members can each include at least one pin for operably engaging the microresonator, beam steering element and/or the electro-optic components. The laser signals emitted by the microresonator can therefore be efficiently coupled to the electro-optic components in order to provide the desired laser output.

28 Claims, 3 Drawing Sheets

MICROLASER ASSEMBLY HAVING A MICRORESONATOR AND ALIGNED ELECTRO-OPTIC COMPONENTS

FIELD OF THE INVENTION

The present invention relates generally to microlaser assemblies and, more particularly, to microlaser assemblies having microresonators, one or more electro-optic components and a beam steering element for controllably aligning the laser signals emitted by the microresonator with the electro-optic components.

BACKGROUND OF THE INVENTION

Modern electro-optical applications are demanding relatively inexpensive, miniaturized lasers capable of producing a series of well-defined output pulses. As such, a variety of microlasers have been developed that include a microresonator and a pair of at least partially reflective mirrors disposed at opposite ends of the microresonator to define a resonant cavity therebetween. The microresonator of one advantageous microlaser includes an active gain medium and a saturable absorber that serves as a Q-switch. See, for example, U.S. Pat. No. 5,394,413 to John J. Zayhowski which issued on Feb. 28, 1995 and U.S. Pat. No. 6,072,815 to Brian L. Peterson which issued on Jun. 6, 2000, the contents of both of which are incorporated in their entirety herein. By appropriately pumping the active gain medium, such as with a laser diode, the microresonator will emit a series of pulses having a predetermined wavelength, pulse width and pulse energy.

As known to those skilled in the art, the wavelength of the signals emitted by a microlaser is dependent upon the materials from which the active gain medium and the saturable absorber are formed. In contrast, the pulse width of the laser pulses emitted by a conventional microlaser is proportional to the length of the resonator cavity. As such, longer resonator cavities will generally emit output pulses having greater pulse widths as defined by the following equation:

$$t_{pw} = \frac{2nl}{c}$$

in which $t_{pw}$ is the pulse width, l is the length of the resonator cavity, n is the refractive index of the microlaser and c is the speed of light. Further, both the pulse energy and average power provided by a microlaser are proportional to the pulse width of the pulses output by the microlaser. All other factors being equal, the longer the microresonator cavity, the longer the pulse width and the greater the pulse energy and average power of the resulting laser pulses as a result of the increased gain.

Conventional microlasers, such as those described by U.S. Pat. No. 5,394,413, are end pumped in a direction parallel to the longitudinal axis defined by the resonator cavity. In this regard, the longitudinal axis of the microresonator cavity extends lengthwise through the resonator cavity and is oriented so as to be orthogonal to the pair of at least partially reflective mirrors that define the opposed ends of the resonant cavity. As such, conventional microlasers are configured such that the pump source provides pump signals in a direction perpendicular to the at least partially reflective mirrors that define the opposed ends of the resonant cavity. The effective length of the resonator cavity is therefore equal to the physical length of the resonator cavity.

While a microlaser can be fabricated such that the resonator cavity has different lengths, a number of factors contribute to generally limit the permissible length of the resonator cavity. In particular, a number of electro-optical applications require microlasers that are extremely small. As such, increases in the length of the resonator cavity are strongly discouraged in these applications since any such increases in the length of the microresonator cavity would correspondingly increase the overall size of the microlaser. In addition, the length of passively Q-switched microlasers is effectively limited by the requirement that the inversion density must exceed a predetermined threshold before lasing commences. As the physical length of the resonator cavity increases, greater amounts of pump energy are required in order to create the necessary inversion density for lasing. In addition to disadvantageously consuming more power to pump the microlaser, the increased pumping requirements create a number of other problems, such as the creation of substantially more heat within the microlaser which must be properly disposed of in order to permit continued operation of the microlaser.

As such, side-pumped microlasers have been developed as described by U.S. patent application Ser. No. 09/337,432, filed Jun. 21, 1999, by Brian L. Peterson, et al. and U.S. patent application Ser. No. 09/337,716 filed Jun. 21, 1999, by Steve Guch, Jr., et at, the contents of both of which are incorporated in their entireties herein. Like an end-pumped microlaser, a side-pumped microlaser includes a microresonator consisting of an active gain medium and a saturable absorber that serves as a Q-switch, and a pair of at least partially reflective mirrors disposed at opposite ends of the microresonator to define a resonant cavity. Unlike an end-pumped microlaser in which the opposed end faces of the microresonator are perpendicular to the longitudinal axis defined by the microresonator, however, the opposed end faces of the microresonator of a side-pumped microlaser are disposed at a non-orthogonal angle, such as between about 30° and about 35° relative to a line perpendicular to the longitudinal axis defined lengthwise through the microresonator. As such, the microresonator will support a zig-zag resonation pattern. In order to initiate the resonation, the microlaser also includes a pump source for introducing pump signals into the active gain medium via a side surface of the microresonator. In response to the pumping of the active gain medium via the side surface, the zig-zag resonation pattern is established within the resonant cavity and a series of pulses are emitted once the necessary inversion density has been reached. As a result of the zig-zag resonation pattern, the effective length of the microresonator of a side-pumped microlaser is increased without having to increase the physical dimensions. Thus, a side-pumped microlaser can generate pulses having greater pulse widths and correspondingly greater pulse energies and average power levels than the pulses provided by end-pumped microlasers of a similar size.

Notwithstanding the advantages offered by side-pumped microlasers, some modern electro-optical applications require pulses that have greater pulse energies and greater average power levels as well as pulses that have different wavelengths than that emitted by a microresonator. As such, microlaser assemblies generally include a microresonator and one or more electro-optic components for receiving the pulses and for modifying the pulses. For example, the electro-optic components can include an optical parametric amplifier for amplifying the pulses. Alternatively, the electro-optic components can include one or more non-linear crystals for altering the wavelength of the pulses, such as by doubling or quadrupling the frequency of the pulses.

In order to appropriately receive and modify the pulses emitted by the microlaser, the electro-optic components must be precisely aligned with the microlaser. As the microlaser and the associated electro-optic components become smaller, this alignment becomes even more necessary, but also more difficult. Moreover, as the requirements for microlaser assemblies increase, the proper alignment of the microlaser and the associated electro-optic components becomes even more critical. Thus, a need exists for microlaser assemblies having microresonators and associated electro-optic components that can be reliably aligned in a precise manner in order to provide the output required by modern electro-optical applications.

SUMMARY OF THE INVENTION

A microlaser assembly is therefore provided that includes a microresonator having an active gain medium and a passive Q-switch, a pump source for inducing resonation of the microresonator and the generation of laser signals, one or more electro-optic components, such as one or more non-linear crystals, amplifiers, oscillators or other active gain mediums, for modifying the laser signals emitted by the microlaser and a beam steering element for aligning the laser signals emitted by the microresonator with the electro-optic components. In one advantageous embodiment, the pump source pumps the active gain medium via a first side surface of the microresonator. In order to support a zig-zag resonation pattern in response to the side pumping, the first and second end faces of the microresonator are typically disposed at a nonorthogonal angle relative to the longitudinal axis defined by the microresonator. As a result of the zig-zag resonation pattern, the microresonator can generate pulses having greater pulse widths and correspondingly greater pulse energies and average power levels than the pulses produced by conventional microresonators of a similar size. In addition, by precisely aligning the laser signals emitted by the microresonator with the electro-optic components, the beam steering element of the microlaser assembly of the present invention facilitates the reliable and efficient operation of the microlaser assembly and supports multiple downstream electro-optic stages for amplifying the laser signals and/or altering the wavelength of the laser signals depending upon the requirements of a particular application.

Preferably, the beam steering element is controllably adjustable so as to precisely align the laser signals emitted by the microresonator with an electro-optic component. For example, the beam steering element can include at least one wedge prism and, in one embodiment, includes a pair of steering Risley prisms. The beam steering element typically provides for the relatively precise alignment of the laser signals emitted by the microresonator with the electro-optic components. In order to provide more general alignment, the microlaser assembly can also include a mechanical alignment member.

In this advantageous embodiment, the microlaser assembly can include a first mechanical alignment member for aligning the microresonator and the beam steering element and a second mechanical alignment member for aligning the beam steering element and the electro-optic component. For example, the first and second mechanical alignment members can each include at least one pin for operably engaging the microresonator, the beam steering element and/or the electro-optic components. In this regard, the microlaser assembly can further include a microresonator mount for supporting the microresonator and a component mount for supporting the electro-optic component. In addition, the microlaser assembly of this embodiment can include a housing for holding the beam steering element. As such, the at least one pin of the first mechanical alignment member can engage the microresonator mount and the housing for generally aligning the microresonator and the beam steering element. Likewise, the at least one pin of the second mechanical alignment member can engage the component mount and the housing for generally aligning the electro-optic component and the beam steering element. As such, the mechanical alignment members can provide general alignment of the microresonator with the electro-optic components, while the controllably adjustable beam steering element provides more precise alignment or fine tuning.

In one advantageous embodiment in which the microresonator is side-pumped, the microresonator also has a second side surface extending between the opposed end faces and opposite the first side surface. As such, the zig-zag resonation pattern includes a number of segments of alternately opposite slope that intersect at respective inflection points proximate one of the first and second side surfaces. As such, the microlaser assembly can include first and second pump sources for introducing pump signals into the active gain medium at locations along the first and second side surfaces, respectively, that coincide with the inflection points. As such, the gain provided by the pump signals can be maximized.

The microlaser assembly of the present invention therefore provides for the alignment of the microresonator, such as a side-pumped microresonator, with one or more electro-optic components, such as one or more non-linear crystals, amplifiers and oscillators. In particular, the microlaser assembly of one embodiment provides for both the general alignment of the microresonator and the electro-optic component by means of one or more mechanical alignment members, as well as the more precise and controllably adjustable alignment of the microresonator and the electro-optic component by means of a beam steering element. Thus, the laser signals emitted by the microresonator can be efficiently coupled to the electro-optic components in order to provide the desired laser output.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
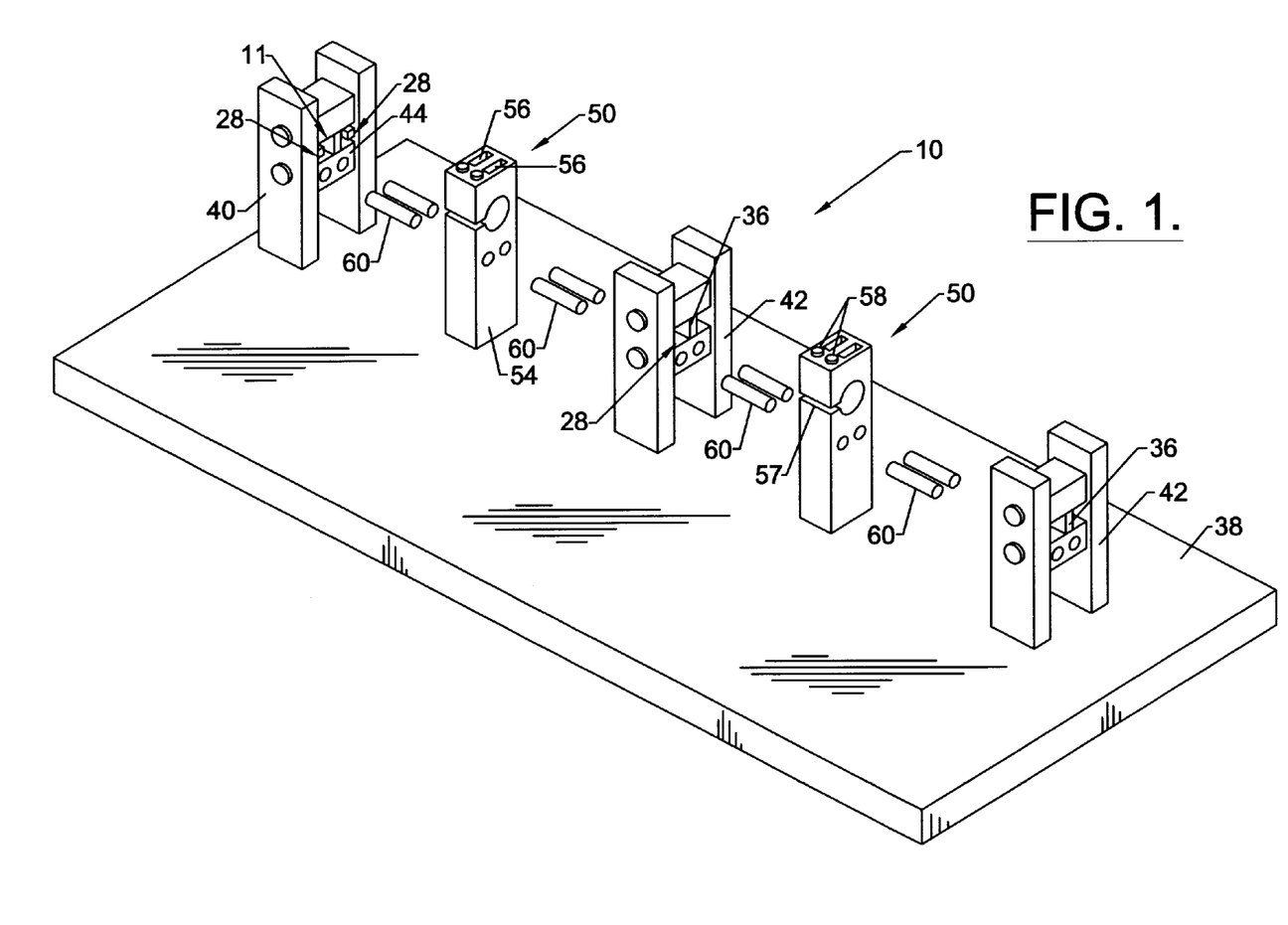
FIG. 1 is a perspective view of a microlaser assembly according to one advantageous embodiment of the present invention.

Referring now to FIG. 1, a microlaser assembly 10 according to one advantageous embodiment of the present invention is illustrated. As shown in more detail in FIGS. 2 and 3, the microlaser assembly includes a microresonator 11 having an active gain medium 12 and a Q-switch 14, such as a passive Q-switch, that is preferably immediately adjacent to the active gain medium. While the microresonator of one advantageous embodiment is fabricated by epitaxially growing the active gain medium upon the Q-switch, the microresonator can be fabricated in other manners. For example, the active gain medium and the Q-switch can be joined by a diffusion bond or by optical contact in which the active gain medium and the Q-switch are attracted with coherent forces, such as Van der Waals forces.

Both the Q-switch 14 and the active gain medium 12 are formed of an appropriately doped host material. Typically, the host material is yttrium aluminum garnet (YAG), although materials such as yttrium vanadate ($YVO_4$) and yttrium lithium fluoride (YLF), can be employed. In addition, while a variety of dopants can be utilized, the active gain medium is typically doped with neodymium (Nd) and the saturable absorber is typically doped with tetravalent chrome. In one advantageous embodiment, for example, the active gain medium is formed of YAG that is doped with between about 2 and about 3 atomic percent of Nd. In this embodiment, the Q-switch or saturable absorber is also formed of YAG and is doped with tetravalent chrome so as to have an optical density of 0.03 to 0.1. As will be apparent, however, the active gain medium and the saturable absorber can be doped with different atomic percentages and different types of dopant without departing from the spirit and scope of the present invention.

Regardless of the material selection, the saturable absorber serves as a Q-switch 14 to prevent the onset of lasing until the inversion density within the microresonator 11 is sufficiently high, i.e., above a predetermined threshold. Once lasing begins, however, the microresonator will produce a series of pulses of a predetermined wavelength, i.e., the lasing wavelength, that have a predetermined pulse width, albeit a longer pulse width than the laser pulses generated by conventional microlasers.

The microresonator 11 extends lengthwise between opposed end faces 16 to thereby define a longitudinal axis 18. As described in U.S. patent application Ser. No. 09/337,432, the active gain medium 12 is preferably proximate one of the opposed end faces and the Q-switch 14 is proximate the other end face. However, the active gain medium and the Q-switch can both extend lengthwise between the opposed end faces as described in U.S. patent application Ser. No. 09/337,716, if so desired.

In order to support a zig-zag resonation pattern within the microresonator 11 so as to effectively lengthen the microresonator cavity, the opposed end faces 16 of the microresonator of one embodiment are each preferably disposed at a nonorthogonal angle ∀ relative to the longitudinal axis 18 defined by the microresonator. While the opposed end faces can be disposed at a variety of nonorthogonal angles ∀ relative to the longitudinal axis, the opposed end faces are typically disposed at an angle ∀ that is between about 30° and about 45° relative to a line perpendicular to the longitudinal axis and, more commonly, at an angle of about 30.9°. Typically, the angle α is defined to be equal to arcsin $$\frac{n_o}{n_r}$$

wherein $n_o$ is the index of refraction for the surrounding environment, such as 1.0 for air; and $n_r$ is the index of refraction of the active gain medium 12.

Since the resonation pattern established by the microresonator 11 is created by the total internal reflection (TIR) of the signals which, in turn, is governed by the refractive indices of the respective materials, the relationship between the thickness T of the microresonator 11 as measured between the first and second opposed side surfaces 20, 22, the length L of the microresonator measured tip to tip, the angle ∀ defined by the opposed end faces relative to the longitudinal axis 18 of the microresonator and the number N of reflections or bounces of the signals from the side surfaces of the microresonator prior to emission can be defined by the following equation:

$$L = \frac{NT}{\tan \alpha} + \frac{T}{\tan \alpha}$$

In addition, the length of each of the first and second sides of the microresonator, i.e., the base length, is defined to be equal to NT/tan α.

Figure 3:
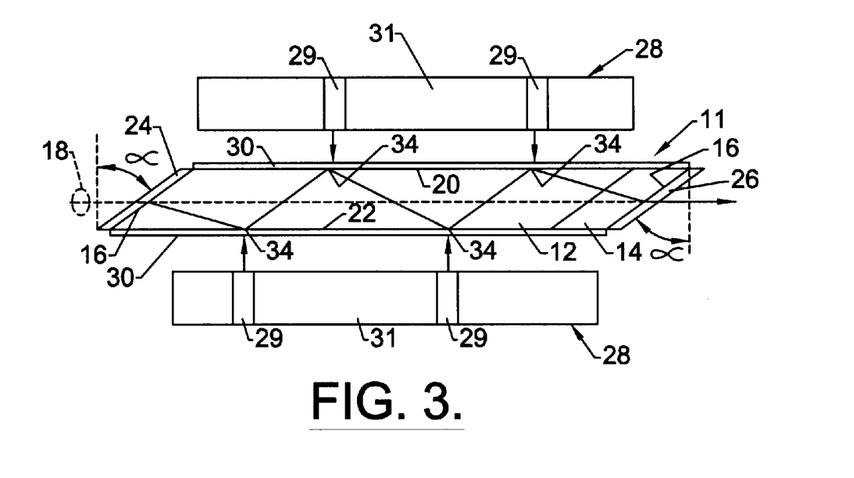
FIG. 3 is a schematic side view of a microresonator with a pair of pump sources for producing a zig-zag resonation pattern therein.

As shown in FIG. 3, the opposed end faces 16 can each be disposed at the same nonorthogonal angle ∀ relative to the longitudinal axis 18 defined by the microresonator 11 such that the opposed end faces are parallel. Alternatively, the opposed end faces can be oriented in opposite directions by the same nonorthogonal angle ∀ relative to the longitudinal axis defined by the microresonator. In either embodiment, the resulting microresonator supports the zig-zag resonation pattern as shown.

By supporting a zig-zag resonation pattern within the microresonator 11, the effective length of the resonation pattern is significantly longer than the physical length of the microresonator as measured along the longitudinal axis 18. In this regard, the effective length of the resonation pattern is defined by the path of the signals as the signals alternately bounce from the opposed side surfaces 20, 22 of the microresonator. For a microlaser assembly 10 that is designed such that the signals reflect or bounce four times from the opposed side surfaces of the microresonator, i.e., N=4, the effective length of the zig-zag resonation pattern is about three to four times longer than the physical length of the microresonator cavity as measured along the longitudinal axis. Since the length of the resonation pattern and the physical length of the resonator cavity are identical for conventional end-pumped microlasers, the microlaser of this embodiment advantageously provides a much longer resonation pattern without requiring that physical dimensions of the microresonator be increased. As a result of the lengthened resonation pattern, the pulse width or pulse duration of the pulses output by the microresonator 11 is increased relative to the pulse width of the pulses output by conventional microlasers of the same size. For example, the pulses output by the microresonator of one embodiment are anticipated to have a pulse width of between 1 and 10 nanoseconds and, more typically, between about 2 and 5 nanoseconds, as compared to the pulses output by conventional end-pump microresonators of the same size which have subnanosecond pulse widths. In addition, the energy delivered by the pulses output by the microresonator assembly of this embodiment should be significantly greater than the energy delivered by the pulses output by conventional end-pumped microresonators of the same size. In this regard, pulses having an energy up to about 100 µJ are anticipated to be emitted by the microresonator of this embodiment in comparison to pulse energies of less than about 35 µJ that are provided by the pulses output by conventional end-pump microresonators of the same size. Correspondingly, the pulses emitted by the microresonator of this embodiment are anticipated to have much greater average powers, such as 0.1 watts to 1 watt, than the average power of conventional end-pumped microresonators that is typically less than 0.1 watts.

The microlaser assembly 10 also includes first and second reflective surfaces 24, 26 disposed proximate respective ones of the opposed end faces 16 to define a microresonator cavity therebetween. As shown in FIG. 3, the first and second reflective surfaces can consist of a multi-layered dielectric coating that is deposited upon the opposed end faces. Alternatively, the first and second reflective surfaces can be formed by first and second dichroic mirrors that are positioned proximate, but slightly spaced from respective ones of the opposed end faces.

In either embodiment, the first reflective surface 24 proximate the end face 16 of the microresonator 11 defined by the active gain medium 12 has a high reflectivity, such as a reflectivity of greater than 99.5%, for signals having the predetermined lasing wavelength, such as 1.064 nanometers for a microresonator having an active gain medium formed of Nd doped YAG. In addition, the second reflective surface 26 that is disposed proximate the end face of the microresonator defined by the passive Q-switch 14 is a partial reflector, typically having a reflectivity of between 40% and 90% for signals having the predetermined lasing wavelengths. See also U.S. Pat. No. 5,394,413 which further describes a pair of mirrors that define the resonator cavity of a microlaser.

Once the active gain medium 12 is pumped such that the inversion density within the microresonator 11 is above the predetermined threshold, the passive Q-switch 14 will permit a series of pulses to be emitted. As a result of the partial reflectivity of the second reflective surface 26, the series of pulses will then be emitted through the second reflective surface.

In order to pump the active gain medium 12 with pump signals, the microlaser assembly 10 also includes a pump source 28. In one advantageous embodiment, the microresonator is side pumped. In this regard, the microresonator has a first side surface 20 extending between the opposed end faces 16. By positioning the pump source such that the pump signals are delivered via the first side surface of the microresonator, the active gain medium is effectively side pumped. While the microlaser can be pumped via a single side surface, the microlaser can, instead, be advantageously pumped via two or more side surfaces, such as the opposed first and second side surfaces 20, 22, as shown in FIG. 3.

Although the wavelength of the pump signals can be tailored to the specific materials that comprise the active gain medium 12, an active gain medium that is comprised of Nd doped YAG is typically pumped with pump signals having a wavelength of 808 +/−3 nanometers. In order to permit the pump signals to be received by the active gain medium without being reflected from the first side surface 20, the microresonator generally includes an antireflection coating 30 deposited upon the first and/or second side surface(s) to permit signals having the wavelength of the pump signals to enter the microresonator 11 with little, if any, reflection.

While the microlaser assembly 10 can include a variety of pump sources 28, the microlaser assembly of one advantageous embodiment utilizes one or more linear laser diode pump arrays 29 that are preferably positioned along the length of the active gain medium 12 as described below. The linear laser diode pump arrays are typically driven by means of current provided by a pair of conductors that have not been depicted for the purposes of clarity, but that are well understood by those skilled in the art. By utilizing a laser diode pump array, the energy delivered via the pump signal is increased dramatically relative to the energy provided by the pump signals of a single stripe laser diode that is typically utilized to end pump conventional microlasers. For example, a linear laser diode array having a length of about 1 cm generally provides pump signals having an average pump power of 15–40 watts, as compared to the 1–3 watts of average pump power provided by the pump signals of a single stripe laser diode.

As a result of the side pumping and the angled configuration of the opposed end faces 16 of the microresonator 11, the resonation pattern established by the microresonator is not parallel to the longitudinal axis 18 as is customary for conventional end-pumped microlasers. Instead, the resonation pattern established by the microresonator of one advantageous embodiment is a zig-zag resonation pattern as shown in FIG. 3. In order to support the zig-zag resonation pattern, the active gain medium 12 is preferably pumped via the first and second side surfaces 20, 22; both of which are coated with an antireflection coating 30 according to this embodiment as shown in FIG. 3. In an alternative embodiment, however, the active gain medium is only pumped via the first side surface. In order to prevent the undesirable loss of pump signals in this alternative embodiment, the second side surface of the microresonator 11, opposite the first side surface through which the pump signals are received, is preferably coated with a reflectance coating that has a high reflectivity, such as a reflectivity of greater than 99.5%, for signals having the wavelength of the pump signals. While the reflectance and/or antireflection coatings deposited upon the first and second side surfaces can be formed in a variety of manners, the reflectance and/or antireflection coatings are typically formed by the deposition of a plurality of dielectric layers having respective indices of refraction that are tailored to provide the proper reflectivity properties as known to those skilled in the art.

Since the microresonator 11 is typically an elongate bar having a generally rectangular cross-section and angled end faces 16, the microresonator also typically includes third and fourth side surfaces 32 extending between the opposed end faces and between the first and second opposed side surfaces 20, 22. In FIG. 3, for example, the third side surface is in view while the fourth side surface faces away from the viewer and is therefore unseen. In order to prevent much, if any, light from entering or departing from the microresonator via the third and fourth side surfaces, the third and fourth side surfaces are typically finely ground or otherwise roughened so-as to diffuse light.

Figure 2:
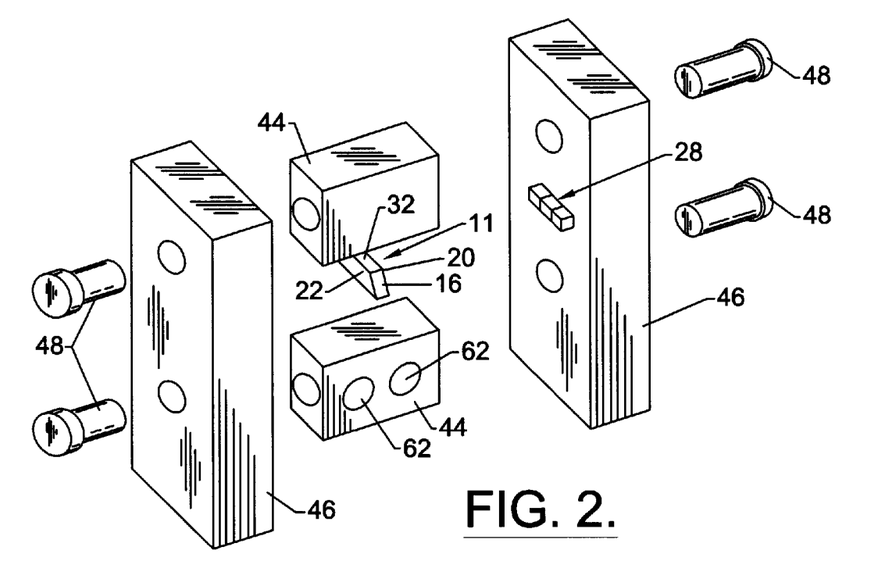
FIG. 2 is an exploded perspective view of the microresonator mount and the microresonator of the microlaser assembly of FIG. 1.

While the active gain medium 12 can be pumped along its entire length, the pump source 28 is preferably designed so as to pump the active gain medium at only a few locations along its length. In this regard, the zig-zag resonation pattern includes a plurality of segments of alternately opposite slope that intersect at respective inflection points 34 proximate the first and second side surfaces 20, 22. As shown in FIG. 3, for example, the zig-zag resignation pattern of one embodiment has two inflection points proximate the first side surface and two inflection points proximate the second side surface. However, the zig-zag resignation pattern supported by the microresonator 11 can have a different number of inflection points, if so desired. In order to efficiently pump the active gain medium, the pump source is therefore preferably designed to have laser diode pump arrays proximate the first side surface and/or the second side surface at locations coincident with the respective inflection points of the zig-zag resonation pattern. In this regard, the pump source can include a first plurality of linear laser diode pump arrays, each of which is located adjacent the first side surface proximate a respective inflection point. In addition, in the embodiment in which the microresonator is side pumped from both the first and second side surfaces, the pump source also preferably includes a second plurality of linear laser diode pump arrays, one of which is adjacent each inflection point proximate the second side surface. As depicted in FIGS. 2 and 3, for example, each pump source can include two or more linear laser diode pump arrays positioned at a respective inflection point and separated by a block 31 of oxygen free high conductivity copper or a block of a thermally conductive, electrically insulating material, such as beryllium oxide (BeO) or aluminum nitride (AlN). As shown in FIG. 2, each linear laser diode pump array also preferably extends laterally alongside the microresonator between the third and fourth side surfaces 32.

In addition to the microresonator 11, the microlaser assembly 10 of the present invention includes one or more electro-optic components 36 positioned downstream of the microresonator in an aligned relationship thereto. As shown in the FIG. 1, the microresonator and the other electro-optic components can be mounted upon a common heat sink 38. Alternatively, the microresonator and the other electro-optic components can be mounted upon different heat sinks or a segmented heat sink if it is desired to maintain the microresonator and the other electro-optic components at different or otherwise independent temperatures. According to one embodiment, the heat sink is an oxygen free high conductivity copper heat sink. However, the heat sink can be any of a variety of active or passive heat sinks including thermoelectric coolers and the like.

In order to appropriately mount the microresonator 11 and the downstream electro-optic components 36 to the underlying heat sink 38, the microlaser assembly 10 also preferably includes a microresonator mount 40 for supporting the microresonator and one or more component mounts 42 for supporting respective electro-optic components. With respect to these mounts, the microlaser assembly can include a variety of different mounts so long as the mounts provide for the conduction of thermal energy from the microresonator or the electro-optic component to the underlying heat sink while maintaining the microresonator or the electro-optic component in a precise predefined position relative to the other components.

According to one embodiment depicted in FIG. 2, the microresonator mount 40 includes bridge portions 44 attached to opposite side surfaces of the microresonator 11. In this regard, the bridge portions are attached to those side surfaces, such as the third and fourth side surfaces 32, that do not receive pump signals during operation of the microresonator. While the bridge portions can be attached to opposed side surfaces of the microresonator in a variety of manners, the bridge portions of one embodiment are soldered, such as by means of an indium solder, to the third and fourth side surfaces of the microresonator. According to the illustrated embodiment, the microresonator mount also includes a pair of upstanding portions 46 that extend upwardly from the underlying heat sink 38. As also shown in FIG. 2, the microresonator mount can include a pair of connectors 48 for connecting the upstanding portions and the bridge portions so that the microresonator is disposed between the upstanding portions. Alternatively, the upstanding portions and the bridge portions of the microresonator mount can be connected by means of a solder, an epoxy or the like in order to eliminate the connectors.

In order to pump the microresonator 11, the pump sources 28 are preferably mounted upon the upstanding portions 46 in alignment with the first and second opposed side surfaces 20, 22 of the microresonator. In this regard, the pump source mounted to each upstanding portion can include a plurality of linear laser diode arrays spaced along the length of the microresonator at locations that coincide with the inflection points 34 of the zig-zag resonation path that are proximate the reflective side surface. The pump sources can be mounted to the upstanding portions in a variety of manners. In one embodiment, for example, the pump sources are mounted to the respective upstanding portions by means of indium solder or a thermally conductive epoxy.

The microresonator mount 40 can be comprised of a variety of thermally conductive materials. For example, the microresonator mount of one embodiment is comprised of oxygen free high conductivity copper in order to facilitate the transmission of thermal energy to the heat sink 38 for disposal. In this regard, the upstanding portions are preferably attached to the underlying heat sink by means of a thermally matched epoxy or the like, such as an aluminum oxide filled or a silver filled epoxy. Although one embodiment of a microresonator mount is illustrated and described above, the microresonator mount can have many other designs depending upon the particular application. For example, the upstanding portions of the microresonator mount can be a single U-shaped structure. In addition, the microresonator and the pump sources can be mounted on a common slab-like mount as described in U.S. Pat. No. 6,072,815, if desired.

As depicted in FIG. 1, the microlaser assembly 10 has one or more electro-optic components 36 positioned downstream of the microresonator 11 for receiving and/or modifying the laser signals emitted by the microresonator. The microlaser assembly can include different types of electro-optic components depending on the application and the manner in which the laser signals are to be modified. For example, the microlaser assembly can include a frquency doubling crystal, typically formed of $KTiOPO_4$, i.e., KTP. By way of example, in the embodiment, such as that depicted in FIG. 3, in which a microresonator having an active gain medium 12 formed of neodymium-doped YAG and a saturable absorber 14 formed of tetravalent chrome-doped YAG emits laser pulses having a wavelength of 1.064 nanometers, the KTP crystal will double the frequency of the laser pulses such that the resulting laser pulses have a wavelength of 532 nanometers.

In addition, the microlaser assembly 10 can include a fourth harmonic generator, typically formed of barium borate (BBO), disposed downstream of the frequency doubling crystal in order to generate a fourth order output. Accordingly, a microlaser assembly that includes a microresonator 11 having an active gain medium 12 formed of neodymium-doped YAG and a saturable absorber 14 formed of tetravalent chrome-doped YAG that emits laser pulses having a wavelength of 1.064 nanometers may include both a frequency doubling crystal and a fourth harmonic generator in order to produce laser pulses having a wavelength of 266 nanometers. Moreover, the microlaser assembly can include other types of nonlinear crystals or harmonic crystals, such as lithium triborate (LBO) that can serve as a second or third harmonic generator depending upon its design. Other nonlinear crystals include, but are not limited to potassium dihydrogen phosphate (KDP), lithium niobate ($LiNbO_3$), cessium triborate (CBO) and cessium lithium triborate (CLBO).

In addition to or instead of nonlinear crystals for altering the frequency of the pulses provided by the microresonator 11, the microlaser assembly 10 can include an optical parametric amplifier and/or an optical parameteric oscillator for emitting signals having a somewhat different wavelength in response to the pulses emitted by the microresonator. For example, an optical parametric amplifier or an optical parametric oscillator can emit signals having a wavelength between 1.5 and 4.5 $\mu$m in response to pulses emitted by the microresonator that have a wavelength of 1.064 $\mu$m. Moreover, the microlaser assembly can include another active gain medium downstream of the microresontator such that the pulses emitted by the microresonator serve to pump the other active gain medium. For example, pulses having wavelength of 1.064 $\mu$m that are emitted by the microresonator can pump another active gain medium comprised of tetravalent chromium doped YAG which, in turn, will emit pulses having a wavelength between 1.3 $\mu$m and 1.6 $\mu$m. As will be apparent, the laser signals emitted by the microlaser assembly of the present invention can therefore be tailored for many specific applications since the frequency and the average power level of the pulses can be modified by introducing appropriate electro-optic components 36 downstream of the microresonator. As shown in FIG. 1, for example, the electro-optic component that is immediately downstream of the microresonator can be an optical parametric amplifier, while the other electro-optic component can be a non-linear crystal for altering the frequency of the laser signals.

Like the microresonator mount 40, the microlaser assembly 10 also preferably includes one or more component mounts 42 for holding the respective electro-optic components 36. As described in conjunction with the microresonator mount, each component mount is designed to hold the respective electro-optic component in a precise, predetermined position relative to the microresonator 11 and the other electro-optic components. In addition, the component mount is preferably fabricated from a material, such as oxygen free high conductivity copper, for facilitating the transmission of thermal energy from the respective electro-optic component to the heat sink 38 for disposal. As will be apparent, the actual configuration of the component mount will be dependent upon the nature of the respective electro-optic component, but the component mounts of one embodiment are the same or similar to the microresonator mount 40, as shown in FIG. 1. As will also be apparent to those skilled in the art, each component mount is preferably attached to the underlying heat sink by means of thermally matched epoxy or the like, such as an aluminum oxide filled or a silver filled epoxy, to further facilitate transfer of thermal energy from the electro-optic component through the component mount to the underlying heat sink.

According to the present invention, the microresonator 11 and the electro-optic components 36 are preferably aligned in a precise manner in order to facilitate the transmission of laser signals, such as pulses, therebetween with minimal loss or attenuation. As such, the microlaser assembly 10 of the present invention also includes a beam steering element 50 disposed between the microresonator and the electro-optic component that is disposed immediately downstream of the microresonator. As described below, the beam steering element aligns the laser signals emitted by the microresonator with the electro-optic component that is immediately downstream thereof. In embodiments that include a series of two or more electro-optic components downstream of the microresonator, the microlaser assembly can include additional beam steering elements disposed between each pair of the electro-optic components in the series.

Each beam steering element 50 is preferably controllably adjustable in order to provide controlled alignment of the laser signals during the initial configuration of the microlaser assembly 10 as well as during any subsequent realignment of the microlaser assembly. In this regard, the beam steering element is typically capable of providing for the controlled adjustment of the direction of the laser signals within a predefined range, such as within an adjustement window of 1°. Accordingly, the beam steering element provides for relatively fine or precise control of the alignment of the laser signals.

Figure 4:
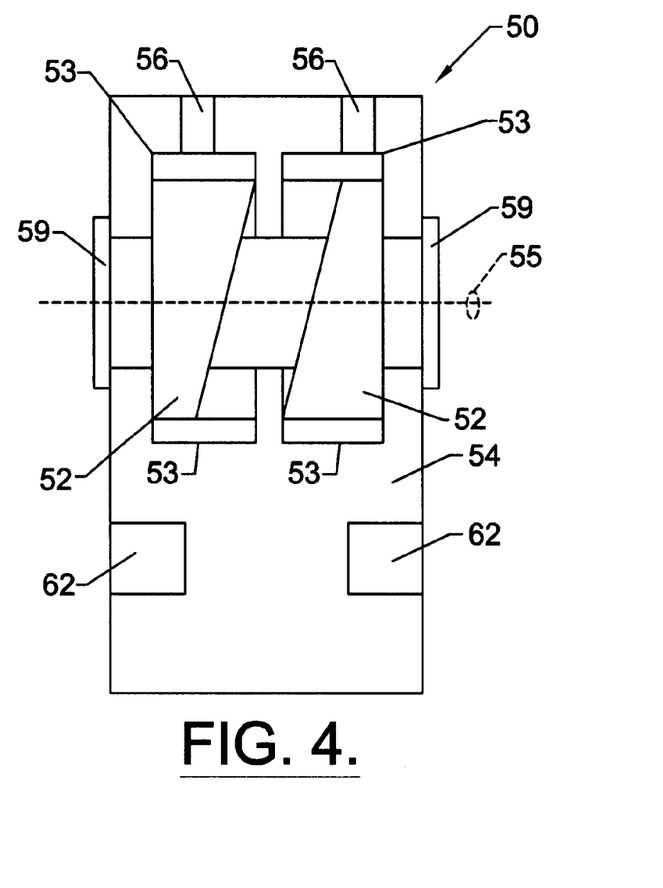
FIG. 4 is a cross-sectional side view of the beam steering element of the microlaser assembly of FIG. 1.

In one advantageous embodiment, the beam steering element 50 comprises at least one and, more typically, a pair of complementary wedge prisms. While the wedge prisms may be formed of various materials, the prisms are commonly formed of quartz or BK-7 glass. For example, the beam steering element can include a pair of steering Risley prisms 52 mounted in respective ring-like mounts 53 that are generally formed of invar, aluminum or the like. As depicted in FIG. 4, the pair of steering Risley prisms are typically disposed within a housing 54 that permits each Risley prism to be independently rotated about the optical axis 55 in order to controllably steer the laser signals. According to one embodiment, for example, the housing defines a pair of slots 56, one of which is associated with each Risley prism, such that each Risley prism can be accessed and rotated about the optical axis in order to adjust the alignment provided by the beam steering element. Once the laser signals have been appropriately aligned such as by detecting that the output of the microlaser assembly 10 has been maximized, the position of the Risley prisms can be fixed. In this regard, the housing can be partially split by another slot 57 that extends from an interior portion of the housing in which the steering Risley prisms are disposed to one side of the housing. As depicted in FIG. 1, the beam steering element of this embodiment can include a locking screw 58 or the like that extends across the slot 57 and can be advanced once the Risley prisms are in the desired positions in order to at least partially close the slot 57 and fix the position of the Risley prisms. As will be apparent, however, the beam steering element can include other means for fixing the position of the Risley prisms once the laser signals are appropriately aligned. If the microlaser assembly must ever be realigned, the locking screw of this embodiment can be loosened in order to permit the Risley prisms to again be rotated relative to the optical axis in order to alter the alignment of the laser signals. As shown in FIG. 4, the housing of the beam steering element can also include a pair of windows 59 proximate respective ones of the Risley prisms for permitting the laser signals to enter and exit the housing. While the housing can include various types of windows, the windows of one embodiment are comprised of sapphire and are coated with an antireflection coating that prevents little, if any, of the laser signals from being reflected.

As described above, the beam steering element 50 generally provides for the relatively precise or fine control of the alignment of the laser signals. However, the microlaser assembly 10 can also include one or more mechanical alignment members 60 for providing general alignment of the microresonator 11 and the electro-optic components 36. In this regard, the mechanical alignment members can include a separate mechanical alignment member for aligning each pair of components in the series of electro-optic components. By way of example, the microlaser assembly can include a first mechanical alignment member for aligning the microresonator and the beam steering element and a second mechanical alignment member for aligning the beam steering element and the electro-optic component that is immediately downstream. Likewise, the microlaser assembly can include other mechanical alignment members for aligning the other electro-optic components in the series with either another beam steering element or another electro-optic component.

While the microlaser assembly 10 can include various types of mechanical alignment members 60, the mechanical alignment members of one embodiment include pins. In this embodiment, each pair of components can be mechanically aligned with one or more pins. In the illustrated embodiment, for example, each pair of components is aligned by a pair of pins. In this regard, the first mechanical alignment member includes a pair of pins for aligning the microresonator 11 and the beam steering element 50. Likewise, the second mechanical alignment member includes a pair of pins for aligning the beam steering element and the electro-optic component 36. While the pins can align the various components in different manners, the mounts 40, 42 and the housing 54 of the illustrated embodiment of the microlaser assembly define a plurality of openings 62 for receiving the end portions of respective ones of the pins. Since the openings defined by the mounts and the housings are disposed in general alignment, the microresonator, the beam steering elements and the electro-optic components carried by the mounts and the housing will be in general alignment once the pins have been inserted into the corresponding openings. As shown in FIG. 2, for example, the bridge portions 44 of the microresonator mount can define a pair of openings for receiving the end portions of a pair of pins. As shown in FIG. 4, the housing of the beam steering element can also define a complementary pair of openings for receiving the opposed end portions of the pair of pins.

According to the present invention, the microlaser assembly 10 is therefore mounted upon the heat sink 28 such that the microresonator 11, the beam steering element 50 and the electro-optic components 36 are in general alignment with one another due to the engagement of the respective components by the mechanical alignment members 60, i.e., the pins. Laser signals emitted by the microresonator can then be more precisely aligned with the downstream electro-optic components by controllably adjusting the beam steering elements, such as by rotating one or both steering Risley prisms 52 about the optical axis. Once the laser signals have been appropriately aligned, as may be determined by maximizing the resulting output provided by the microlaser assembly, the position of the steering Risley prisms can be fixed, thereby enabling the microlaser assembly to operate in an efficient manner with a minimum of signal loss or attenuation due to misalignment.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A microlaser assembly comprising:
   a microresonator comprising an active gain medium and a passive Q-switch, said microresonator extending lengthwise between opposed first and second end faces, said microresonator also having a first side surface extending between the opposed end faces;
   a pump source for introducing pump signals into the active gain medium via the first side surface of said microresonator such that a zig-zag resonation pattern is established therewithin in order to generate laser signals that are emitted via the second end face of said microresonator;
   an electro-optic component for modifying the laser signals emitted by said microresonator; and
   a beam steering element disposed between said microresonator and said electro-optic component for aligning the laser signals emitted by said microresonator with said electro-optic component.

2. A microlaser assembly according to claim 1 wherein said beam steering element is controllably adjustable.

3. A microlaser assembly according to claim 2 wherein said beam steering element comprises at least one wedge prism.

4. A microlaser assembly according to claim 3 wherein said beam steering element comprises a pair of steering Risley prisms.

5. A microlaser assembly according to claim 1 further comprising a mechanical alignment member for generally aligning said microresonator and said electro-optic component.

6. A microlaser assembly according to claim 5 wherein said mechanical alignment member comprises a first mechanical alignment member for aligning said microresonator and said beam steering element and a second mechanical alignment member for aligning said beam steering element and said electro-optic component.

7. A microlaser assembly according to claim 6 wherein said first and second mechanical alignment members each comprise at least one pin.

8. A microlaser assembly according to claim 7 further comprising:
   a microresonator mount for supporting said microresonator;
   a component mount for supporting said electro-optic component;
   a housing for holding said beam steering element; and
   wherein said at least one pin of said first mechanical alignment member engages said microresonator mount and said housing for generally aligning said microresonator and said beam steering element, and wherein said at least one pin of said second mechanical alignment member engages said component mount and said housing for generally aligning said electro-optic component and said beam steering element.

9. A microlaser assembly according to claim 1 wherein said electro-optic component is selected from the group consisting of a nonlinear crystal, an amplifier, an oscillator and another active gain medium.

10. A microlaser assembly according to claim 1 wherein said microresonator also has a second side surface extending between the opposed end faces and opposite the first side surface, wherein the zig-zag resonation pattern comprises a plurality of segments of alternately opposite slope that intersect at respective inflection points proximate one of said one of the first and second side surfaces, and wherein said pump source comprises first and second pump sources for introducing pump signals into the active gain medium at locations along the first and second side surfaces, respectively, that coincide with the inflection points.

11. A microlaser assembly according to claim 1 wherein passive Q-switch is immediately adjacent said active gain medium.

12. A microlaser assembly according to claim 11 wherein said passive Q-switch is proximate the second end face of said microresonator.

13. A microlaser assembly comprising:
a microresonator comprising an active gain medium and a passive Q-switch, said microresonator defining a longitudinal axis between opposed first and second end faces that are each disposed at a nonorthogonal angle relative to the longitudinal axis, said microresonator also having a first side surface extending between the opposed end faces;
a pump source for introducing pump signals into the active gain medium via the first side surface of said microresonator in order to generate laser signals that are emitted via the second end face of said microresonator;
an electro-optic component for modifying the laser signals emitted by said microresonator; and
a beam steering element disposed between said microresonator and said electro-optic component for aligning the laser signals emitted by said microresonator with said electro-optic component.

14. A microlaser assembly according to claim 13 wherein said beam steering element is controllably adjustable.

15. A microlaser assembly according to claim 14 wherein said beam steering element comprises at least one wedge prism.

16. A microlaser assembly according to claim 13 further comprising a mechanical alignment member for generally aligning said microresonator and said electro-optic component.

17. A microlaser assembly according to claim 16 wherein said mechanical alignment member comprises a first mechanical alignment member for aligning said microresonator and said beam steering element and a second mechanical alignment member for aligning said beam steering element and said electro-optic component.

18. A microlaser assembly according to claim 17 further comprising:
a microresonator mount for supporting said microresonator;
a component mount for supporting said electro-optic component;
a housing for holding said beam steering element, and
wherein said first mechanical alignment member comprises at least one pin for engaging said microresonator mount and said housing in order to generally align said microresonator and said beam steering element, and wherein said second mechanical alignment member comprises at least one pin for engaging said component mount and said housing in order to generally align said electro-optic component and said beam steering element.

19. A microlaser assembly according to claim 13 wherein said electro-optic component is selected from the group consisting of a nonlinear crystal, an amplifier, an oscillator and another active gain medium.

20. A microlaser assembly according to claim 13 wherein passive Q-switch is immediately adjacent said active gain medium.

21. A microlaser assembly according to claim 20 wherein said passive Q-switch is proximate the second end face of said microresonator.

22. A microlaser assembly comprising:
a microresonator comprising an active gain medium and a passive Q-switch, said microresonator extending lengthwise between opposed first and second end faces;
a pump source for introducing pump signals into the active gain medium of said microresonator in order to generate laser signals that are emitted via the second end face of said microresonator;
an electro-optic component for modifying the laser signals emitted by said microresonator;
a mechanical alignment member for generally aligning said microresonator and said electro-optic component; and
a controllably adjustable beam steering element disposed between said microresonator and said electro-optic component for precisely aligning the laser signals emitted by said microresonator with said electro-optic component following general alignment by said mechanical alignment member.

23. A microlaser assembly according to claim 22 wherein said beam steering element comprises at least one wedge prism.

24. A microlaser assembly according to claim 22 wherein said mechanical alignment member comprises a first mechanical alignment member for aligning said microresonator and said beam steering element and a second mechanical alignment member for aligning said beam steering element and said electro-optic component.

25. A microlaser assembly according to claim 24 further comprising:
a microresonator mount for supporting said microresonator;
a component mount for supporting said electro-optic component;
a housing for holding said beam steering element; and
wherein said first mechanical alignment member comprises at least one pin for engaging said microresonator mount and said housing in order to generally align said microresonator and said beam steering element, and wherein said second mechanical alignment member comprises at least one pin for engaging said component mount and said housing in order to generally align said electro-optic component and said beam steering element.

26. A microlaser assembly according to claim 22 wherein said electro-optic component is selected from the group consisting of a nonlinear crystal, an amplifier, an oscillator and another active gain medium.

27. A microlaser assembly according to claim 22 wherein passive Q-switch is immediately adjacent said active gain medium.

28. A microlaser assembly according to claim 27 wherein said passive Q-switch is proximate the second end face of said microresonator.

* * * * *